3,281,263
METHOD FOR MODIFYING POLYMERIC SUBSTANCES WITH HIGH ENERGY RADIATION
Charles P. Priesing, Midland, Henry Volk, Bay City, and Charles E. Grabiel, Midland, Mich., assignors to The Dow Chemical Company, Midland, Mich., a corporation of Delaware
No Drawing. Filed Mar. 17, 1961, Ser. No. 96,363
23 Claims. (Cl. 117—62)

This invention relates to a method of enhancing the properties of shaped polymeric articles, i.e., fibers and other filamentary articles, films, foils, sheets, etc., by modifying at least the surface of the article with certain beneficial adjuvants or additaments. It has particular reference to an improved method of modifying shaped articles by subjecting the articles to irradiation while in intimate contact with the modifying adjuvants.

Presently, it is a common fact that none of the polymeric materials enjoy the prestige of being universally adaptable for all uses. They all suffer from having certain deficiencies, lackings, limitations, or drawbacks in their inherent physical make-up exhibited in their physical properties or aesthetic characteristics.

By way of delineating certain of the referred-to deficiencies, it is well known, for example, that unmodified cotton may rot; viscose rayon as either a filamentous or filmiform shaped article, may be similarly affected. In addition, viscose rayon has notorious susceptibilty to being adversely affected by water. Thus, such forms of regenerated cellulose may generally be characterized by their rather poor wet strength and reduced resilience in the presence of moisture. Wool, cotton and viscose rayon may be too hydrophilic for many purposes. Similarly, many of the thermoplastics are too hydrophobic for many applications. Polyamides, polyacrylics, polyolefins, and the like tend to accumulate static charges which present processing difficulties or just general nuisance behaviors to the user. Many lack in dye receptivity from the standpoint of both too little dye uptake and in the limited classes of dyestuffs that may advantageously and simply be applied.

The attempts to overcome these and cognate difficulties, particularly in textile materials, has been multitudinous. The dissatisfactorily low rot resistance of cotton, for example, has been the basis for many ameliorative treating and processing techniques thereupon, including cyanoethylation of the natural fiber or cloth and fabric textile materials constructed therefrom. Likewise, many polymeric and resinous coatings and finishes have been proposed and employed both for cotton, viscose rayon and the like substantially pure cellulosic textile fibers and the articles into which they are converted in order to augment and improve their resistance to rotting, moisture, wrinkling, soil redeposition and for other corollary and analogous purposes. Regenerated cellulose and unregenerated cellulose films and sheets, including paper and the like, have received a great deal of attention that is akin to that which is cursorily alluded to in the foregoing. Likewise, intensive efforts have been made with resinous additives, finishes, and impregnates for use with polyamides, cellulose esters and ethers, polyesters, polyolefins, polyacrylics, sarans and the like hydrophobic and relatively difficultly dyeable polymers to make them more universally adaptable.

One such technique that has been used to beneficially introduce modifying adjuvants is to employ radiation energy which aids in imparting the desired enhancements.

The chief aim and concern of the present invention is to provide an improved and significantly superior method for modifying shaped articles of various polymeric substrate articles and materials, particularly fibers and cloth and fabric comprised thereof and constructed therefrom, rods, bristles and other filamentous articles, and film and sheet structures, by providing them with at least a superficial coating or chemically modified surface, or both, or even a like penetrating subsurface effect, of certain monomeric substances that are adapted to chemically polymerize to form a polymeric or resinous coating for or over the polymeric substrate or to react chemically with the polymeric substrate or to graft copolymerize with the polymeric substrate to form a chemically bound polymeric or resinous superficial layer thereover or permeated section thereof, or to beneficially modify the substrate by combination effects of the indicated varieties.

According to the present invention, a substantially polymeric substrate in shaped article form may advantageously be modified for improvement in and benefit to one or more of its basic physical properties and characteristics such as rot resistance, water-proofness, hygroscopicity, or dye receptivity by a method which comprises first contacting, and, if desired, impregnating, the polymeric substrate with an aqueous medium containing a water-soluble or water-dispersible monomeric material that is polymerizable in aqueous systems under the influence of a field of ionizing high energy radiation and admixed with a water-soluble or water-dispersible polymer characterized in having the ability to increase the viscosity of the aqueous medium when dispersed therein and being of different composition than the polymeric substrate; then subsequently exposing the intimately mixed polymeric substrate and monomer-polymer impregnant thereof (and, advantageously, at least partially swollen thereby) to a field of ionizing high energy radiation until at least the surface of the substrate has become modified with reacted monomeric material. The process is amenable to either a batch or continuous operation.

As has been indicated, the reacted monomeric material may become chemically attached to the polymeric substrate, as, for instance is the case when cotton and other cellulosic fibers are modified with acrylonitrile by practice of the present invention, or it may graft copolymerize thereon and thereto or may merely form an intimately bonded and firmly attached physical polymeric or resinous layer or coating or impregnated section, or both, on or in the substrate as a result of polymerization of the water-soluble monomer. In any event, and without being restricted to particular mechanisms by which the desired improvement may be achieved and effected, the properties of the polymeric substrate are ameliorated and enhanced in one or more ways, depending on the particular monomeric material or mixture of monomers that is employed and the specific effects that they are capable of achieving and the properties and characteristics they are adapted to contribute in and for the polymeric substrate.

Thus, the present invention takes advantage of the significant improvements in processing treatments and product properties afforded through the incorporation of a water-soluble or water-dispersible polymer in the monomer-impregnating medium. Impregnating the polymeric shaped article with an aqueous monomer-polymer system achieves several notable advantages which were not achieved in prior radiation-induced polymeric-ameliorating processes. Improved monomer solution retention, adsorption and diffusion in the polymeric shaped article; more uniform polymer formation in the shaped article, e.g., more uniform grafting; lower evaporation rate of water and volatile monomer; the use of higher processing temperatures; more efficient use of squeezing, rolling, or pressing devices to control monomer pickup by impregnation; and a self-lubricating solution are all provided by the instant invention. Additionally, the physical properties, e.g., tensile properties, and aesthetic qualities, e.g., "hand" or "feel," of the article are protected against radiation effects. Further, the polymer has no deleterious effects on the treated article, the polymer being sufficiently readily removed from the treated article, if desired, generally, by a simple washing technique. It is surprising to note that the beneficial improvements are only achieved when a monomer-polymer combine are administered simultaneously to the polymeric substrate. Sequential treatments do not afford equal results. Further, the formation of homopolymer during irradiation is of no benefit at all.

Another important embodiment of the invention, as a result of the many processing improvements afforded by the invention as mentioned above, a highly efficient continuous process is made possible. Thus, heretofore mutual pre-impregnation radiation-induced grafting processes suffer from limited operating conditions. For example, pre-mature drying of the impregnated monomer result in inefficient penetration and distribution and ultimately irregular and non-uniformly treated products. As a result, low processing temperatures necessarily must be maintained which generally dictates slower operating speeds to obtain adequate efficiency.

The polymeric shaped substrates that may be treated in accordance with this invention include those types of polymeric substrates that are found already shaped in nature, or which may be slightly altered in their transformation to more useful shapes, such as the proteinaceous substances, wool and silk, or the pure cellulosic materials, principally cotton. Also included are the regenerated cellulosics exemplified in viscose rayon and cellophane; and the modified cellulosics, i.e., cellulose ethers, and cellulose esters, e.g., cellulose acetate, propionate, butyrate, etc. Entirely synthetic polymeric, including copolymeric, substrates, likewise, may be beneficially treated according to the invention, for instance, polyamides, e.g., nylon "6," i.e., polymerized ε-caprolactam nylon "66," i.e., a polymer from adipic acid and hexamethylenediamine; polyacrylics, e.g., acrylonitrile polymers; polyesters, e.g., polyethylene terephthalate; polyolefins, e.g., polyethylene, polypropylene, copolymers of ethylene and propylene, and so forth; sarans, and similar polymeric materials that are adaptable to be fabricated into shaped articles.

The monomers that are employed as the modifying adjuvants for the polymeric substrate in the practice of the present invention are water-dispersible or water-soluble monomers that are polymerizable while in contact with aqueous media under the influence of a field of ionizing high energy radiation. Thus, representative of the monomeric materials that can profitably be utilized in the instant inventive process are: vinyl pyridines; acrylic acid; methacrylic acid, acrylamide; quaternary ammonium-containing vinyl monomers such as vinyl benzyltrimethyl ammonium chloride; vinyl-substituted cyclic carbamates, e.g., vinyl oxazolidinone, 5-methyl-N-vinyl-2-oxazolidinone; vinyl lactams including N-vinyl pyrrolidones, N-vinyl caprolactam; or the somewhat related vinyl morpholinones, e.g., N-vinyl-3-morpholinone; methoxy polyglycol methacrylate; sulfonated acrylates and methacrylates and their alkali metal salts, e.g., sulfomethyl acrylate, 2-sulfoethylmethacrylate, sodium salt; acryloyl taurines, e.g., N-acryloxyl-aminomethane sulfonic acid; maleic acid; vinylidene chloride; vinyl chloride; acrylonitrile; methylene-bis-acrylamide and other diethylenically unsaturated monomers such as the divinyl ether of diethylene glycol, and divinylbenzene; styrene; pentamethyl vinyl disiloxane; triethoxy vinyl silane; vinyl benzylamine hydrochloride.

Monomers that may be employed with particular advantage in the practice of the present invention are of the type having the general formula:

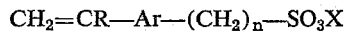

$$CH_2=CR-Ar-(CH_2)_n-SO_3X$$

wherein R is selected from the group consisting of hydrogen and methyl, Ar is an aromatic radical (including nuclear substituted aromatic radicals) containing from 6 to 10 carbon atoms, $n$ has a value of 0 and 1 and X is selected from the group consisting of hydrogen and alkali metals. Advantageously, the sulfonated alkenyl aromatic monomer is arranged with the sulfonated substituent in a position that is para to the alkenyl group. Sulfonated alkenyl aromatic monomers that may be employed suitably in the practice of the invention include sulfonated styrene monomers, sulfonated vinyl toluene monomers, sulfonated vinyl xylene monomers, sulfonated vinyl naphthalene monomers and vinyl benzyl sulfonates.

Combinations of two or more of the above and other monomers may be co- or sequentially-impregnated in or on the polymeric substrate to achieve certain desirable properties and effects.

The polymers that are incorporated in the aqueous monomer-impregnated medium are most advantageously water-soluble or water-dispersible polymers characterized in that their presence in the aqueous medium effects an increase in the viscosity of the medium. Hence, illustrative of a few of the many suitable polymers are: the alkali metal and ammonium salts of polystyrene sulfonate and sulfonated polyvinyl toluene; polyvinyl alcohol; polyacrylamide; methyl cellulose; carboxyl methyl cellulose; maleic anhydride-styrene copolymer; methacrylic acid-sodium styrene sulfonate copolymer; and poly-N-vinyl-4-methyl oxazolidinone.

Generally, it is preferable that the incorporated water-soluble or water-dispersible polymer be either inert to radiation sensitization or at least significantly less sensitive to radiation than the preformed polymeric substrate under the same radiation conditions. That is, the polymer is less susceptible to the formation by radiation in the polymer molecule of sites on which a polymerizing monomer can propagate. Accordingly, polymers absent reactive hydrogen atoms, i.e., hydrogens alpha to functional groups for instance, are particularly suitable polymers for use in the impregnation solution in carrying out the invention.

As another modification of the invention, in addition to the polymer additives in the monomer-containing immersion solution, the incorporation in the solution of certain at least partially water-soluble inorganic salts beneficially enhances the treating process. Thus, the property enhancement intended by the modifying adjuvant is also improved. The potassium and sodium chlorides, fluorides, bromides, iodides, ferrocyanates, sulfites, sulfates, nitrates and acetates, as well as other salts consisting of other cations such as calcium, nickel, manganese, cobalt, iron, copper, etc. with the above-named anions have been found suitable to incorporate in the immersion or impregnation solution in concentrations of from about 1 to 10 percent, based on the weight of the solution.

The high energy radiation which is utilized for inducing the graft copolymerization in the monomer/polymeric substrate mixtures is of the type which provides emitted particles or photons having an intrinsic energy of a magnitude which is greater than the planetary electron binding energies which occur in the graft copolymerizable mixture or combination of materials. Such high energy radiation is conveniently available from various radioactive substances which provide beta or gamma radiation as, for example, radioactive elements cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour (or equivalent ionizing potency) intensity. A roentgen, as is commonly understood, is the amount of high energy radiation as may be provided in a radiation field which produces in one cubic centimeter of air at a temperature of 0° C. under 760 millimeters of absolute mercury pressure such a degree of conductivity that one electrostatic unit of charge is measured at saturation (when the secondary electrons are fully utilized and the wall effect of the chamber is avoided).

It is most desirable to graft copolymerize all of the monomeric impregnant to and with the polymeric substrate while the mixture is being subjected to the influence of the mutual high energy radiation. Room temperatures may be employed satisfactorily for irradiation although elevated temperatures may also be utilized. The preferred radiation dosage in million roentgen equivalent physicals (mrep.) that is employed is in an amount or quantity that is adapted to quickly accomplish the graft copolymerization without deleteriously influencing or degrading the polymeric substrate.

Generally, a radiation dosage between, say, about 0.25 and 10 megarads (mrad.) may be satisfactorily employed. A megarad is one million rads. A rad is the amount of ionizing high energy radiation which produces an absorption of 100 ergs of energy per gram of absorbing material. This unit is widely accepted as a convenient means of measuring radiation absorption materials. It is defined in "Radiation Dosimetry" by Hine and Brownell, Academic Press (1956). Oftentimes it may be more advantageous when the dosage that is utilized for affecting the desired graft copolymerization is between about 0.5 and 5 mrads.

Obviously, the greatest economy and advantage may be achieved when minimum high energy radiation dosages are involved. Greatly excessive dosages should be assiduously avoided to avoid degradation of the reactants, especially after all or substantially all of the monomer has become graft copolymerized to the polymeric substrate. After the radiation-induced graft copolymerization has been completely accomplished, it may oftentimes be desired to scour or otherwise purify the modified polymeric substrate product in order to ensure the removal therefrom of any residual unreacted monomer (or even loosely associated polymer of the monomer) that may not have entered into chemical combination with the substrate under influence of the high energy irradiation.

Generally, the preferable practice of the invention is to first immerse the shaped polymeric substrate in an aqueous solution, emulsion, or dispersion of the polymerizable monomer and water-soluble or water-dispersible polymer, and, if desired, including an at least partially water-soluble salt of the indicated variety, while applying agitation to the mixture. Then, prior to subjecting the impregnated article to the ionizing radiation, removing any excess solution from the substrate, for instance, by squeezing.

The time of impregnation is not critical. Adequate contacting of the polymeric substrate with the solution can be accomplished in one second or so. Satisfactory results are usually obtained in five minutes or less.

As a general rule, better results are obtained if the impregnation solution is maintained at a pH of about 7. However, the reactivity of the monomer, polymer and substrate will more or less dictate the pH of the solution which may range from about 1 to 12.

As is the case during the radiation step, the preferred atmosphere over the impregnation medium is nitrogen or some other inert gas. Oxygen tends to inhibit grafting of the monomer to the substrate.

The concentrations of the monomer and polymer in the impregnation or immersion solution are governed somewhat by the intended results, that is, what components are being employed, how much build-up on the substrate is desired, etc. It is usually preferable, as hereinbefore indicated, that water be present in the impregnation medium. Thus, monomer concentration may be from about 0.5 to about 98 weight percent, based on the weight of the solution. More advantageously, monomer concentrations in the range of 2 to 20 weight percent, based on the weight of the solution are employed.

As mentioned previously, the amount of polymer that is beneficial will depend on the components of the mixture. For the most part, the amount of polymer should be sufficient to have an increasing effect on the viscosity of the solution. This will depend on the molecular weight of the polymer and may differ from one polymer to another. Usually, from about 0.1 to 10 weight percent or so polymer, based on the weight of the solution, is beneficially employed. Preferable quantities are in the range of 5 weight percent, based on the weight of the solution.

Ordinarily, the polymeric substrate will pick up in the neighborhood of from 1 to 75 weight percent of the monomeric material. As a general beneficial practice, between about 1 and 30 weight percent and more advantageously, between about 1 and 15 weight percent, based on the dry weight of the polymeric substrate, of reacted monomeric material is permanently combined with the substrate.

If desirable, and frequently beneficial, other constituents may be added to the impregnating solution. These might be wetting agents and the like, or agents which may assist in solvating either the monomers or polymers present, but such agents should preferably not have any solvating effects on the polymeric substrate.

By way of further illustration, the following examples are given in which all parts and percentages are by weight unless otherwise indicated.

Example 1

A 30-yard length of 12-inch wide white cellulose acetate fabric, dry density, 0.063 g./in.$^2$, was continuously passed through an aqueous bath containing 5 percent, based on the weight of the solution, sodium styrene sulfonate, and 0.1 percent, based on the weight of the solution, "Dowfax 2A1" (dodecyldiphenyl oxide disulfonic acid, sodium salt), as a wetting agent. The web speed was about 0.782 ft./min. so that the residence time of the fabric in the solution was about 15 seconds. On emerging from the bath, the fabric passed through a set of squeeze rollers which functioned to remove excess solution, maintain a uniform surface layer, and control the monomer to substrate ratio. From the rollers the fabric passed beneath a scanning radiation beam of a 2-million electron volt Van de Graaf Accelerator in air at room temperature. Subsequently the fabric was passed through a water-washing bath and then into a scouring bath containing 1 percent, based on the weight of the solution "Dupanol M.E." (a long chain alcohol sulfonate detergent). A total dose of 3 mrads. at a beam current of 200 microamps was given the fabric. Beam scan at the window was 12 inches and was perpendicular to the direction of fabric travel. Analysis indicated about 9 percent pickup of monomer, based on the dry weight of the fabric, of which about 67 percent was converted to graft copolymer with the substrate. About 17 percent of the monomer remainder unreacted and about 15 percent of the monomer was converted to homopolymer.

The fabric was then dyed in a 1.5 percent by weight solution of Wool-Fast Blue BLA Extra (Colour Index Acid Blue 59), an acid dye. It was then rinsed, scoured, rinsed again and finally dried.

In accordance with the foregoing procedure, several other samples of the cellulose acetate fabric were prepared and treated excepting to add a polymer along with the monomer in the substrate immersion bath according to the practice of the invention.

The samples so-treated were dyed according to the foregoing procedure with Wool-Fast Blue BLA Extra. Reflectance values were then determined for each sample as a measure of the dye receptivity of the cellulose acetate fabric. The dye receptivity of the fiber or fabric, as indicated by its reflectance value, was evaluated spectrophotometrically by measuring the reflectivity of light from the dyed sample using a "Photovolt Reflectometer" with a white incandescent light transmitting through a red filter. A greater spread of reflectance values on the meter scale is obtained with the red filter providing more accurate readings. A value of zero was set for the reflectance from a black enamel tile and a value of 100 was set for the reflectance from a white magnesium oxide block. On this scale, a white enamel tile gave a reflectance reading of 88. Patches of the dyed fabric were folded twice and placed on a white enamel tile, to provide a uniform background, and the reflectance value for the sample was determined. This procedure gave accurate and reproducible results.

The results are given in Table I. The Δ reflectance values in the Table are the difference in reflectance units between the sample prepared without any polymer in the impregnation bath, Sample No. 1, and the indicated sample. Thus, the greater the Δ value the darker the shade on the sample contrasted to Sample No. 1.

About 1.5 times as much monomer reacted with and became permanently combined with the fabric in Sample C than in Sample B. Thus, Sample C contained about 13 weight percent reacted monomer and Sample B contained about 8.6 weight percent reacted monomer, based on the dry weight of the fabric.

Various physical properties were then determined for each sample, the results of which are set forth in Table II.

TABLE II

| Melt Point | Sample A | Sample B | Sample C |
|---|---|---|---|
| Lower limit, ° F | 390 | (¹) | 410 |
| Softening | 390 | (¹) | None |
| Stiffening | 410 | (¹) | None |
| Browning | 410 | | 410 |
| Burning | None | | 482 |
| Melting | 525 | | None |
| Warp: | | | |
| Tensile (p.s.i.) | 34.5 | 26.5 | 34 |
| Percent Elongation | 17.1 | 24.7 | 39.4 |
| Fill: | | | |
| Tensile (p.s.i.) | 17.6 | (¹) | 24.7 |
| Percent Elongation | 24.4 | (¹) | 25.5 |

¹ Not determined.

*Example 3*

Fourteen inch square pieces of white cellulose acetate taffeta fabric were immersed for one hour with agitation

TABLE I

| Sample No. | Polymer in Monomer Impregnating Bath | Polymer Concentration, Weight Percent (based on weight of solution) | Dose (Mrads.) | Current (μ amp) | Reflectance | Δ Reflectance |
|---|---|---|---|---|---|---|
| 1 | None | 0 | 3 | 230 | 61.6 | 0 |
| 2 | Sulfonated polystyrene, sodium salt | 4 | 3 | 230 | 60.3 | 1.3 |
| 3 | Sulfonated polyvinyl toluene, sodium salt | 4 | 3 | 230 | 57.9 | 3.7 |
| 4 | Sulfonated polyvinyl toluene, ammonium salt | 4 | 3 | 230 | 54.4 | 7.2 |
| 5 | Polyvinyl alcohol | 4 | 3 | 230 | 59.6 | 2.0 |
| 6 | Starch | 5 | 3 | 180 | 61.2 | 0.4 |
| 7 | Styrene-maleic anhydride copolymer | 4 | 3 | 230 | 57.9 | 3.7 |
| 8 | do | 1.3 | 3 | 180 | 57.7 | 3.9 |
| 9 | Polyacrylamide | 1 | 3 | 180 | 60.1 | 1.5 |
| 10 | Methyl cellulose | 4 | 3 | 230 | 61.3 | 0.3 |
| 11 | Carboxyl methyl cellulose | 4 | 3 | 230 | 60.4 | 1.2 |
| 12 | Sulfonated styrene, sodium salt—Methacrylic acid copolymer | 4 | 3 | 230 | 61.4 | 0.2 |

As can be seen from Table I, samples impregnated with a polymer present were dyed to significantly deeper shades. Additionally, it was readily obvious to the eye that samples impregnated with the polymer were much more uniformly dyed than the sample that was not impregnated with a polymer in the monomer impregnating bath.

*Example 2*

Following the procedure of Example 1, again using the same type cellulose acetate fabric, three samples were prepared by immersing a sample of the fabric in an aqueous solution having the following compositions, weight percents as indicated are based on the weight of the solution.

Sample A:
  0.1 weight percent "Dowfax 2A1"
Sample B:
  10 weight percent sodium styrene sulfonate
  0.1 weight percent "Dowfax 2A1"
Sample C:
  10 weight percent sodium styrene sulfonate
  5 weight percent sulfonated polystyrene, sodium salt
  4 weight percent sodium bromide
  1 weight percent sodium sulfate by rolling in 200 ml. of a nitrogen-sparged solution, the solvent of which was water or a water-ethanol mixture, containing two different monomers, and 5 percent sodium polystyrene sulfonate, M.W. about 286,000, 3 percent sodium bromide and 1 percent sodium sulfate. The fabric was removed from the immersion solution and pressed between rollers to remove excess solution before radiation. High energy radiation from a 2 m.e.v. Van de Graaf Electron Accelerator was applied to the fabric at room temperature in air, total dose in one pass, 3 mrad.; beam current, 230μ amps; scan, 15 inches; and ramp speed, 22.4 cm./minute. The product was then rinsed in water for 0.5 hour, scoured in 1 percent Dupanol-M.E. solution at 80°–90° C. for one hour, rinsed again for 0.25 hour, dyed in 15. percent by weight solution of Wool-Fast Blue BLA Extra for 0.5 hour, rinsed in water for 0.25 hour, scoured a second time for 0.25 hour and finally rinsed in water for an additional 0.25 hour, and dried.

Reflectance values were determined for the samples and compared with a control which had been treated the same as the other samples except that the impregnation solution consisted only of water. Δ values were obtained from the difference between the reflectance value of the control and the value of the indicated sample. As in Example 1, the higher the Δ value the deeper the shade. Results are presented in Table III.

TABLE III

| Sample No. | Monomer No. 1 | Wt. Percent (based on weight of solution) | Monomer No. 2 | Wt. Percent (based on weight of solution) | Solvent | Wt. Percent Monomer Reacted with Substrate (based on dry weight of fabric) | Δ Reflectance |
|---|---|---|---|---|---|---|---|
| 1 | 4-Vinyl Pyridine | 5 | Sodium Styrene Sulfonate | 5 | Water | 29.9 | 54.5 |
| 2 | N-vinyl pyrrolidone | 5 | ...do... | 5 | ...do... | 16.6 | 33.9 |
| 3 | Vinyl benzyl trimethylammonium chloride | 5 | ...do... | 10 | ...do... | 19.8 | 31.9 |
| 4 | Acrylic acid | 5 | ...do... | 10 | ...do... | 23.3 | 24.3 |
| 5 | Methacrylic acid | 5 | ...do... | 5 | 67% ethanol | 21.9 | 32.0 |
| 6 | Vinylidene chloride | 5 | ...do... | 5 | ...do... | 0.63 | 27.8 |
| 7 | Acrylamide | 5 | ...do... | 5 | Water | 11.3 | 27.7 |
| 8 | Triethoxy vinyl silane | 5 | ...do... | 5 | 67% ethanol | 0.0 | 27.4 |
| 9 | Methylene bis acrylamide | 5 | ...do... | 5 | Water | 9.13 | 21.4 |
| 10 | Acrylonitrile | 5 | ...do... | 8 | Ethanol/water | 13.2 | 22.8 |
| 11 | p-Vinyl phenyl sulfone | 2 | ...do... | 5 | ...do... | 5.6 | 28.2 |
| 12 | Styrene | 5 | ...do... | 5 | ...do... | 0.3 | 12.5 |
| 13 | Divinylbenzene | 2 | ...do... | 1.5 | ...do... | 2.3 | 10.4 |
| 14 | 5-methyl-N-vinyl-2-oxazolidinone | 5 | Acrylic Acid | 5 | 95% ethanol | 7.4 | 25.7 |
| 15 | Vinyl benzyl amine hydrochloride | 5 | ...do... | 5 | ...do... | 5.9 | 12.4 |
| 16 | Divinylbenzene | 5 | ...do... | 5 | ...do... | 6.4 | 9.5 |
| 17 | Pentamethyl vinyl disiloxane | 5 | ...do... | 5 | ...do... | 2.8 | 1.4 |
| Control | | | | | Water | | 0 |

*Example 4*

The procedure of Example 3 was repeated except to employ cotton fabric in place of the cellulose acetate fabric, and to use only 2.5 weight percent sodium polystyrene sulfonate in the fabric immersion solution. A ramp speed of 19.2 cm./min. was employed. A water solution was used in each instance. These results are presented in Table IV.

TABLE IV

| Sample No. | Wt. Percent Sodium Styrene Sulfonate in Immersion Soln. (Based on wt. of Solution) | Other Monomer In Immersion Solution | Wt. Percent (Based on Wt. of Solution) | Wt. Percent Monomer Reacted With Substrate (based on Dry Weight of Fabric) | Δ Reflectance |
|---|---|---|---|---|---|
| 1 | 10 | | | 9.4 | 4.0 |
| 2 | 0 | Acrylic Acid | 10 | 12.2 | 7.5 |
| 3 | 5 | ...do... | 5 | 12.6 | 2.7 |
| 4 | 10 | Acrylonitrile | 7 | 13.9 | 8.2 |
| 5 | 5 | Acrylonitrile Acrylic plus Acid | 7 / 5 | 16.9 | 7.6 |
| 6 | 5 | Vinyl Pyridine | 5 | 12.0 | 33.0 |
| 7 | 0 | Acrylonitrile | 7 | 6.2 | 26.6 |
| 8 | 5 | Vinylbenzyl trimethyl ammonium chloride | 5 | 11.4 | 23.2 |
| 9 | 5 | 5-methyl-N-vinyl-2-oxazolidinone | 10 | 5.9 | 4.0 |
| 10 | 0 | ...do... | 10 | 10.5 | 36.9 |
| Control | | | | | 0 |

*Example 5*

Twelve inch square pieces of white cellulose acetate taffeta were immersed for one hour with agitation by rolling in 200 ml. of a nitrogen-sparged solution containing 10 percent sodium styrene sulfonate, 5 percent sodium polystyrene sulfonate, M.W. 286,000, 4 percent sodium bromide, and 1 percent sodium sulfate, all percentages based on the weight of the solution. The fabric was removed and pressed between rollers to remove excess solution, then subjected to high energy radiation from a Van de Graaf, 2 m.e.v., electron accelerator. The fabric was laid on a ramp which passed beneath the beam at a rate of 22.4 cm./min. at a distance of 8 inches from the source. A total dose of 3 mrad. was applied in one pass under the beam operating at 230μ amps and scanning 14 inches at room temperature in air. The product was then rinsed in tap water for 0.5 hour, scoured in 1.0 percent Dupanol-ME solution for 1.0 hour, rinsed in tap water 0.25 hour, dyed in a 1.50 percent dye bath of Wool-Fast Blue BLA Extra for 0.5 hour, rinsed in water 0.25 hour, scoured in 1 percent Dupanol-ME solution for 0.25 hour, rinsed in water for 0.25 hour, and pressed between two layers of wetted, clean cotton cloth, and finally dried.

Another sample was run in accordance with the above except that no polymer or salts were present in the immersion solution.

Reflectance values were determined for the dyed samples. Additionally, portions of the dyed samples were exposed to 160 standard fadeometer hours to determine their light stability, which was determined in terms of reflectance values, and the results compared to the light stability of a dyed but untreated sample. Larger Δ reflectance values indicate less color stability to light. These results are tabulated in Table V.

TABLE V

| Sample No. | Immersion Solution Conc. in wt. percent (based on weight of solution) | | | | Wt. Percent Monomer Pickup (based on dry weight of fabric) | Reflectance | Light Stability Δ Reflectance 160 S.F.H. |
|---|---|---|---|---|---|---|---|
| | Monomer | Polymer | Salts | pH | | | |
| 1 | 10 | 5 | 5 | 7 | 12.96 | 46.5 | 4.5 |
| 2 | 10 | 5 | 5 | 7 | 12.20 | 44.5 | 3.5 |
| 3 | 10 | 5 | 5 | 12 | 11.50 | 43.0 | 2.5 |
| 4 | 10 | 5 | 5 | x | 5.19 | 38.8 | 2.2 |
| 5 | 10 | 0 | 0 | 7 | 8.62 | 46.5 | 6.0 | x 5% solution of sodium phosphate tribasic.

Example 6

An oriented polyacrylonitrile fiber that contains about 1 part of polymer hydrated with about 2 parts of water is soaked for about 15 minutes in a 10 percent aqueous solution of sodium vinyl sulfonate containing about 5 percent, based on the weight of solution, sulfonated polyvinyl toluene. The wet fiber is then irradiated after flushing the solution well with nitrogen and removing excess solution from the impregnated sample, by exposing the fiber to an electron beam from a Van de Graaf generator operating under a potential of 2 million electron volts at a dose rate of 6.5 mrad. per second until a total dosage of about 10 mrad. is effected. The irradiated yarn is then washed thoroughly with water, dried, heat treated for 5 minutes at 150° C., scoured and is then dyed for one hour at the boil with 2 percent, based on the dry weight of the fiber (O.W.F.), Sevron Brilliant Red 4G (Colour Index Basic Red 14), a basic dye formerly known as Basic Red 4G. A deep red uniform shade of coloration is obtained.

In contrast, when the same procedure is repeated, excepting to eliminate the sulfonated polyvinyl toluene from the solution, uniformity of shade is markedly decreased.

Example 7

"Nylon 6-6" staple fiber is scoured and soaked for 30 minutes in a 10 percent aqueous solution of sodium p-styrene sulfonate containing about 5 percent, based on the weight of the solution, of a copolymer of styrene and maleic anhydride. The wet fiber, containing about 10 percent of the monomer impregnated therein, is then exposed at a distance of about 1 centimeter from a Machlett OEG–50 tube that is being operated at 50,000 volts and 50 milliamperes. The exposure is continued for 25 minutes. The irradiated yarn is then washed thoroughly with water, dried, scoured and is then dyed at the 2 percent level (O.W.F.) for one hour at the boil in Sevron Brilliant Red 4G. A deep even red shade of coloration is obtained.

The graft copolymerized fiber product is also dyed well to deep and level shades of coloration with Amacel Scarlet BS, an acetate type of dyestuff (no Colour Index).

In comparison, fiber treated as above without the presence of the copolymer in the soaking solution tends to dye uneven and splotchy. Additionally, the "hand" tends to be more harsh than the monomer-polymer impregnated fiber.

Example 8

A sample of cloth woven from polyethylene terephthalate ("Dacron") yarn is scoured and soaked for about an hour at 75° C. in a 50 percent aqueous solution of N-vinyl pyrrolidone containing about 6 percent, based on the weight of the solution, polyvinyl alcohol. The polymer is thereby impregnated with about 15 percent of the monomer. The wet fiber is then exposed at a distance of about 1 centimeter from a Machlett OEG–50 tube that is being operated at 50,000 volts at 50 milliamperes. The exposure is continued for 25 minutes. The irradiated yarn is then washed thoroughly with water, dried, scoured and dyed for one hour at the boil with 4 percent (O.W.F.) (according to the conventional technique) of Calcodur Pink 2BL (Colour Index Direct Red 75). A deep and level shade of pink is obtained in the irradiated portion. The remainder of the cloth sample, however, is not even stained by the dyestuff.

In further contrast, "Dacron" yarn treated as above without the beneficial addition of the polymer is dyed to lighter and more unlevel shades.

Other augmenting treatments and alterations to the instant inventive process will be obvious to those skilled in the art. Included might be pre-radiation and post-radiation of the polymeric article before and after impregnation, respectively, certain heat treatments, etc. For these and related reasons, this invention is not intended to be limited by the foregoing, but instead to be interpreted in light of the hereto appended claims.

What is claimed is:

1. The method of improving the characteristics and properties of solid, shaped polymeric substrate articles, said articles having been shaped by a prior fabrication treatment, which comprises; contacting said shaped polymeric article with an aqueous solution consisting essentially of a mixture of a monomeric material that is polymerizable in aqueous media under the influence of high energy radiation and a polymer to improve the uniformity of graft polymerizing of said monomeric material onto said shaped article and selected from the group consisting of a water-soluble and a water-dispersible polymer characterized in having the ability to increase the viscosity of said aqueous media when dispersed therein and being of different composition than said shaped polymeric article; removing the excess of said aqueous solution from said shaped article; exposing said polymeric substrate that is still wet with and containing said mixture of monomeric material and polymer to a field of ionizing high energy radiation until at least the surface of said substrate has become modified with monomeric material graft polymerized thereon; and, subsequently removing substantially all of said polymer from said shaped article.

2. The method of claim 1, wherein the concentration of said monomeric material in said aqueous solution is from about 2 to about 20 weight percent, based on the weight of the solution, and wherein the concentration of said polymer in said aqueous solution is from about 0.1 to about 10 weight percent, based on the weight of the solution.

3. The method of claim 1, wherein at least the surface of said substrate has become modified with between about 1 and 30 weight percent, based on the weight of dry substrate, with graft polymerized monomeric material.

4. The method of claim 1, wherein said shaped polymeric substrate is a pure cellulosic substrate.

5. The method of claim 1, wherein said shaped polymeric substrate is a proteinaceous substrate.

6. The method of claim 1, wherein said shaped polymeric substrate is a cellulose ester substrate.

7. The method of claim 1, wherein said shaped polymeric substrate is an acrylonitrile polymer substrate.

8. The method of claim 1, wherein said shaped polymeric substrate is a polyamide substrate.

9. The method of claim 1, wherein said shaped polymeric substrate is a polyester substrate.

10. The method of claim 1, wherein said shaped polymeric substrate is a polyolefin substrate.

11. The method of claim 1, wherein said monomeric material is a sulfonated alkenyl aromatic monomer compound of the structure:

$$CH_2=CR-Ar-(CH_2)_n-SO_3X$$

wherein R is selected from the group consisting of hydrogen and methyl, Ar is an aromatic radical having from 6 to 10 carbon atoms, $n$ has a value of 0 or 1, and X is selected from the group consisting of hydrogen and an alkali metal.

12. The method of claim 1, wherein said monomeric material is a N-vinyl heterocyclic monomer.

13. The method of claim 1, wherein said monomeric material is a quaternary ammonium-containing vinyl monomer.

14. The method of claim 1, wherein said monomeric material is a diethylenically unsaturated monomer.

15. The method of claim 1, wherein said monomeric material is selected from the group consisting of a vinyl monomer containing a carboxylic acid group and a vinyl monomer containing an alkali metal salt of a carboxylic acid.

16. The method of claim 1, wherein said monomeric material is a mixture of at least two different monomers.

17. The method of claim 1, wherein said polymer is a sulfonated polystyrene.

18. The method of claim 1, wherein said polymer is sulfonated polyvinyl toluene.

19. The method of claim 1, wherein said polymer is a copolymer of styrene and maleic anhydride.

20. The method of claim 1, wherein said polymer is less sensitive to ionizing high energy radiation than said shaped polymeric substrate.

21. The method of claim 1, wherein said field of high energy radiation is applied to said polymeric substrate containing said mixture of monomeric material and polymer until a dosage of between about 0.25 and 10 megarads is effected.

22. The method of claim 1, wherein said field of high energy radiation is applied to said polymeric substrate containing said mixture of monomeric material and polymer until a dosage of between about 0.5 and 5 megarads is effected.

23. The method of improving the characteristics and properties of solid, shaped polymeric substrate articles, said articles having been shaped by a prior fabrication treatment, which comprises; contacting said shaped polymeric article with an aqueous solution consisting essentially of a mixture of a monomeric material that is polymerizable in aqueous media under the influence of high energy radiation and a polymer to improve the uniformity of graft polymerizing of said monomeric material onto said shaped article and selected from the group consisting of a water-soluble and a water-dispersible polymer characterized in having the ability to increase the viscosity of said aqueous media when dispersed therein and being of different composition than said shaped polymeric article, and from about 1 to about 10 weight percent, based on the weight of said solution, of an at least partially water-soluble inorganic salt; removing the excess of said aqueous solution from said shaped article; exposing said polymeric substrate that is still wet with and containing said mixture of monomeric material, polymer and inorganic salt to a field of ionizing high energy radiation until at least the surface of said substrate has become modified with monomeric material graft polymerized thereon; and, subsequently removing substantially all of said polymer and inorganic salt from said shaped article.

References Cited by the Examiner

UNITED STATES PATENTS

| | | | |
|---|---|---|---|
| 2,804,446 | 8/1957 | Roth | 260—29.6 |
| 2,809,959 | 10/1957 | Roth | 260—29.6 |
| 2,973,309 | 2/1961 | Brodkey et al. | 204—154 |
| 2,999,056 | 9/1961 | Tanner | 204—154 |
| 3,097,960 | 7/1963 | Lawton et al. | 8—62 |

FOREIGN PATENTS

| | | |
|---|---|---|
| 525,278 | 5/1956 | Canada. |
| 758,735 | 10/1956 | Great Britain. |

MURRAY TILLMAN, *Primary Examiner.*

JOHN R. SPECK, *Examiner.*

SAMUEL H. BLECH, W. L. BASCOMB,
*Assistant Examiners.*